US012713270B2

(12) United States Patent
Zewail et al.

(10) Patent No.: US 12,713,270 B2
(45) Date of Patent: Aug. 18, 2026

(54) AMBIENT INTERNET OF THINGS (IOT) COEXISTENCE WITH ELECTRONIC SHELF LABEL (ESL)

(71) Applicant: QUALCOMM Incorporated, San Diego, CA (US)

(72) Inventors: Ahmed Abdelaziz Ibrahim Abdelaziz Zewail, San Diego, CA (US); Zhifei Fan, San Diego, CA (US); Chengjin Zhang, San Diego, CA (US); Robin Heydon, Cambridge (GB); Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 18/632,079

(22) Filed: Apr. 10, 2024

(65) Prior Publication Data

US 2025/0324303 A1 Oct. 16, 2025

(51) Int. Cl.

| | |
|---|---|
| ***H04W 24/10*** | (2009.01) |
| ***H04B 7/06*** | (2006.01) |
| ***H04B 17/318*** | (2015.01) |
| ***H04W 24/08*** | (2009.01) |

(52) U.S. Cl.

CPC .......... *H04W 24/10* (2013.01); *H04B 7/0632* (2013.01); *H04B 17/328* (2023.05); *H04W 24/08* (2013.01)

(58) Field of Classification Search

CPC .... H04W 24/10; H04W 24/08; H04B 7/0632; H04B 17/328

See application file for complete search history.

(56) References Cited

U.S. PATENT DOCUMENTS

| | | | | |
|---|---|---|---|---|
| 9,936,451 | B2 * | 4/2018 | Zhu | H04W 52/0209 |
| 2016/0014549 | A1 * | 1/2016 | Jones | H04W 4/80<br>455/41.1 |
| 2017/0026905 | A1 * | 1/2017 | Denboer | H04W 4/80 |
| 2017/0134606 | A1 * | 5/2017 | Kim | H04N 1/00307 |
| 2021/0092797 | A1 * | 3/2021 | Miyamoto | H04W 8/005 |

(Continued)

FOREIGN PATENT DOCUMENTS

| | | | |
|---|---|---|---|
| WO | 2024045118 | A1 | 3/2024 |
| WO | 2024045166 | A1 | 3/2024 |

OTHER PUBLICATIONS

International Search Report and Written Opinion—PCT/US2025/017713—ISA/EPO—Apr. 28, 2025.

(Continued)

*Primary Examiner* — Noel R Beharry
*Assistant Examiner* — Phillip J Kearns
(74) *Attorney, Agent, or Firm* — Polsinelli

(57) ABSTRACT

Systems and techniques are provided for wireless communication. For example, a process can include measuring a signal strength of a first advertisement beacon from a second device of a second wireless system; comparing the signal strength of the first advertisement beacon to a threshold signal strength; determining a delay period for the second wireless system based on the comparison of the signal strength of the first advertisement beacon to a threshold signal strength; and outputting a second advertisement beacon for transmission based on the determined delay period.

20 Claims, 10 Drawing Sheets

(56) References Cited

U.S. PATENT DOCUMENTS

| | | | | |
|---|---|---|---|---|
| 2024/0323257 | A1* | 9/2024 | Sorin | H04L 41/0803 |
| 2024/0430799 | A1* | 12/2024 | Graube | H04W 56/001 |

OTHER PUBLICATIONS

Woolley M., "Bluetooth Core Specification Version 5.4", Bluetooth Technical Overview, Feb. 7, 2023, pp. 1-43, XP093175129, section 1.2, 1.2.4.1.

Woolley M., "The Bluetooth Low Energy Primer 1.1.0", Bluetooth Technical Overview, Jan. 17, 2023, 79 pages, XP093099960, section 7.7.4.

* cited by examiner

AMBIENT INTERNET OF THINGS (IOT) COEXISTENCE WITH ELECTRONIC SHELF LABEL (ESL)

FIELD

Aspects of the present disclosure generally relate to wireless communications. For example, aspects of the present disclosure relate to ambient Internet of Things (IoT) devices (e.g., "tags") coexisting with electronic shelf label (ESL) devices.

INTRODUCTION

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a first device for wireless communication is provided. The first device includes at least one memory and at least one processor coupled to the at least one memory. The at least one processor is configured to: measure a signal strength of a first advertisement beacon from a second device of a second wireless system; compare the signal strength of the first advertisement beacon to a threshold signal strength; determine a delay period for the second wireless system based on the comparison of the signal strength of the first advertisement beacon to a threshold signal strength; and output a second advertisement beacon for transmission based on the determined delay period.

As another example, a method for wireless communications by a first device of a first wireless system is provided. The method includes: measuring a signal strength of a first advertisement beacon from a second device of a second wireless system; comparing the signal strength of the first advertisement beacon to a threshold signal strength; determining a delay period for the second wireless system based on the comparison of the signal strength of the first advertisement beacon to a threshold signal strength; and outputting a second advertisement beacon for transmission based on the determined delay period.

In another example, a non-transitory computer-readable medium having stored thereon instructions is provided. The instructions, when executed by at least one processor, cause the at least one processor to measure a signal strength of a first advertisement beacon from a second device of a second wireless system; compare the signal strength of the first advertisement beacon to a threshold signal strength; determine a delay period for the second wireless system based on the comparison of the signal strength of the first advertisement beacon to a threshold signal strength; and output a second advertisement beacon for transmission based on the determined delay period.

As another example, a first device for wireless communication is provided. The first device includes: means for measuring a signal strength of a first advertisement beacon from a second device of a second wireless system; means for comparing the signal strength of the first advertisement beacon to a threshold signal strength; means for determining a delay period for the second wireless system based on the comparison of the signal strength of the first advertisement beacon to a threshold signal strength; and means for outputting a second advertisement beacon for transmission based on the determined delay period.

Aspects generally include a method, apparatus, system, computer program product, non-transitory computer-readable medium, user equipment, base station, wireless communication device, and/or processing system as substantially described herein with reference to and as illustrated by the drawings and specification.

In some aspects, one or more of the apparatuses described herein comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus(es) includes at least one camera for capturing one or more images or video frames. For example, the apparatus(es) can include a camera (e.g., an RGB camera) or multiple cameras for capturing one or more images and/or one or more videos including video frames. In some aspects, the apparatus(es) includes at least one display for displaying one or more images, videos, notifications, or other displayable data. In some aspects, the apparatus(es) includes at least one transmitter configured to transmit one or more video frame and/or syntax data over a transmission medium to at least one device. In some aspects, the at least one processor includes a neural processing unit (NPU), a neural signal processor (NSP), a digital signal processor (DSP), a central processing unit (CPU), a graphics processing unit (GPU), any combination thereof, and/or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
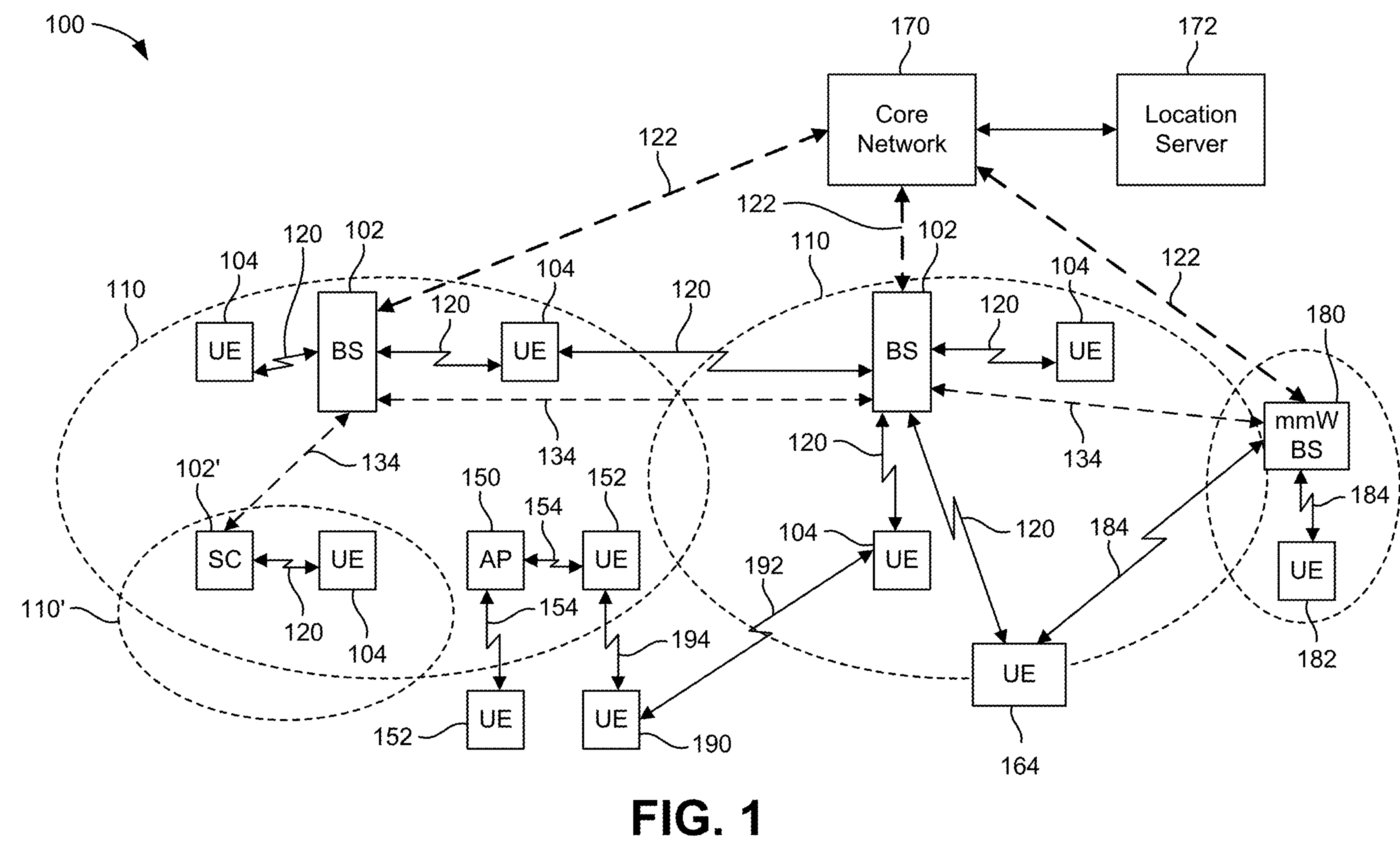
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, client devices can be utilized that may be associated with different signaling and communication needs. For example, as 5G networks expand into various verticals (e.g., industrial verticals) and the quantity of deployed Internet-of-Things (IoT) devices grows, network service categories such as enhanced Mobile Broadband (eMBB), Ultra Reliable Low Latency Communications (URLLC), and massive Machine Type Communications (mMTC), etc., may be expanded to better support various IoT devices. For example, IoT devices can include ambient IoT devices, which can include passive IoT devices (e.g., energy harvesting devices that provide backscattering signals), semi-passive IoT devices (e.g., energy harvesting devices with or without active transmission), etc.

For example, passive IoT devices and semi-passive IoT devices are relatively low-cost UEs that may be used to implement one or more sensing and communication capabilities in an IoT network or deployment. In some examples, passive and/or semi-passive IoT sensors (e.g., as an example of passive/semi-passive IoT devices) can be used to provide sensing capabilities for various processes and use cases, such as shelf labels (e.g., price labels), asset management, logistics, warehousing, manufacturing, etc. Passive and semi-passive IoT devices can include one or more sensors, a processor or micro-controller, and an energy harvester for generating electrical power from incident downlink radio frequency (RF) signals received at the passive or semi-passive IoT device.

Based on harvesting energy from incident downlink RF signals (e.g., transmitted by a network device such as a base station, gNB, etc.), energy harvesting devices (e.g., such as passive IoT devices, semi-passive IoT devices, etc.) can be provided without an energy storage element and/or can be provided with a relatively small energy storage element (e.g., battery, capacitor, etc.). Energy harvesting devices can also be referred to as energy harvesting IoT devices. Energy harvesting devices can be deployed at large scales, based on the simplification in their manufacture and deployment associated with implementing wireless energy harvesting.

In a wireless communication network environment (e.g., cellular network, etc.), a network device (e.g., such as a base station or gNB, etc.) can be used to transmit downlink RF signals to energy harvesting IoT devices (e.g., passive and/or semi-passive IoT devices). Such a network device can be referred to as an energizing device or an energizer. In one illustrative example, a base station or gNB can read and/or write information stored on energy harvesting IoT devices by transmitting the downlink RF signal. A downlink RF signal can provide energy to an energy harvesting IoT device and can be used as the basis for an information-bearing uplink signal transmitted back to the network device by the energy harvesting IoT device (e.g., based on reflecting or backscattering a portion of the incident downlink RF signal). The base station or gNB can read the reflected signal transmitted by an energy harvesting IoT device to decode the information transmitted by the IoT device (e.g., such as sensor information collected by one or more sensors included in the IoT device, etc.).

Energy harvesting device such as zero power IoT (ZP-IoT) devices, energy harvesting Bluetooth™ low energy (EH-BLE) device, etc., may include passive IoT devices that rely on energy harvesting and passive communication (also referred to as low power communication) technologies, such as backscatter communications. With such technologies, low power and low cost of devices can be achieved. In some examples, for a given downlink signal with a given input RF power received at an energy harvesting device, the input RF power is provided to the device's energy harvester (e.g., with a percentage being converted to useful electrical power based on the conversion efficiency of the harvester and stored in an energy storage device, such as a battery, capacitor, etc. This stored power may be used for powering the device to perform tasks, such as processing, sensing, communications, displaying, etc. For example, the stored power may be used to listen (e.g., monitor) for downlink transmissions, receiving sensor information, updating displays, transmitting uplink messages, etc.

In some cases, an energy harvesting system may coexist with an electronic shelf label (ESL) system. For example, in a retail use case, a retailer may have a number of electronic shelf label (ESL) devices spread over a relatively large area. An ESL system may be a system for display labels, such as price labels, that may be updated using wireless communications with an ESL AP. The ESL system may include label devices along with wireless nodes (e.g., ESL AP) for communicating with the label devices. In some cases, the retailer may use ESL devices along with energy harvesting tags. Energizing devices may also be used to provide power to the energy harvesting devices. In some cases, a wireless device, such as an interrogator device, AP, wireless node, etc. may operate as an ESL AP to communicate with ESL devices as well as function as an energizer/reader device for energizing energy harvesting devices. In some cases, an ESL device may also be an energy harvesting device. In some cases, ESL devices and energy harvesting devices may operate on the same or overlapping frequencies. To help avoid potential interference, techniques for ambient IoT coexistence with ESL devices may be useful.

Systems, apparatuses, processes (also referred to as methods), and computer-readable media (collectively referred to as "systems and techniques") are described herein for ambient IoT coexistence with ESL devices. For example, the systems and techniques described herein can be used by an energy harvesting system (e.g., ambient IoT system) to sense for ESL systems and align the energy harvesting system with the ESL system to help avoid interference.

According to some aspects, an ESL system may include an ESL AP along with one or more ESL display devices. The ESL AP may periodically broadcast an advertisement packet and after a periodic advertising response slot delay, the one or more ESL display devices may transmit a response to the advertisement packet. An energizer of an energy harvesting system may periodically scan for ESL AP transmissions. If an ESL AP transmission is detected, a signal strengthsignal strength of the ESP AP transmission may be determined. If the signal strength is too low (e.g., below a threshold signal strength), the energizer may ignore the ESL AP transmission. If the signal strength is above the threshold signal strength, the energizer may attempt to align the transmissions of the energy harvesting system with the transmissions of the ESL system. For example, the energizer may determine a delay period for the ESL system and transmit an advertisement packet of the energizer based on the determine delay period. The delay period may correspond to the periodic advertising response slot delay. The energizer may expect responses from one or more energy harvesting devices to the advertisement packet of the energizer after a certain amount of time (e.g., after a certain number of slots), and the energizer may adjust a time when the advertisement packet of the energizer is transmitted so that the responses from the one or more energy harvesting devices occur during the delay period.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 102 an indication of the signal that the UE 104 received with a highest signal strength or an otherwise acceptable signal strength.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" or "monitoring" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal strength based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHZ) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
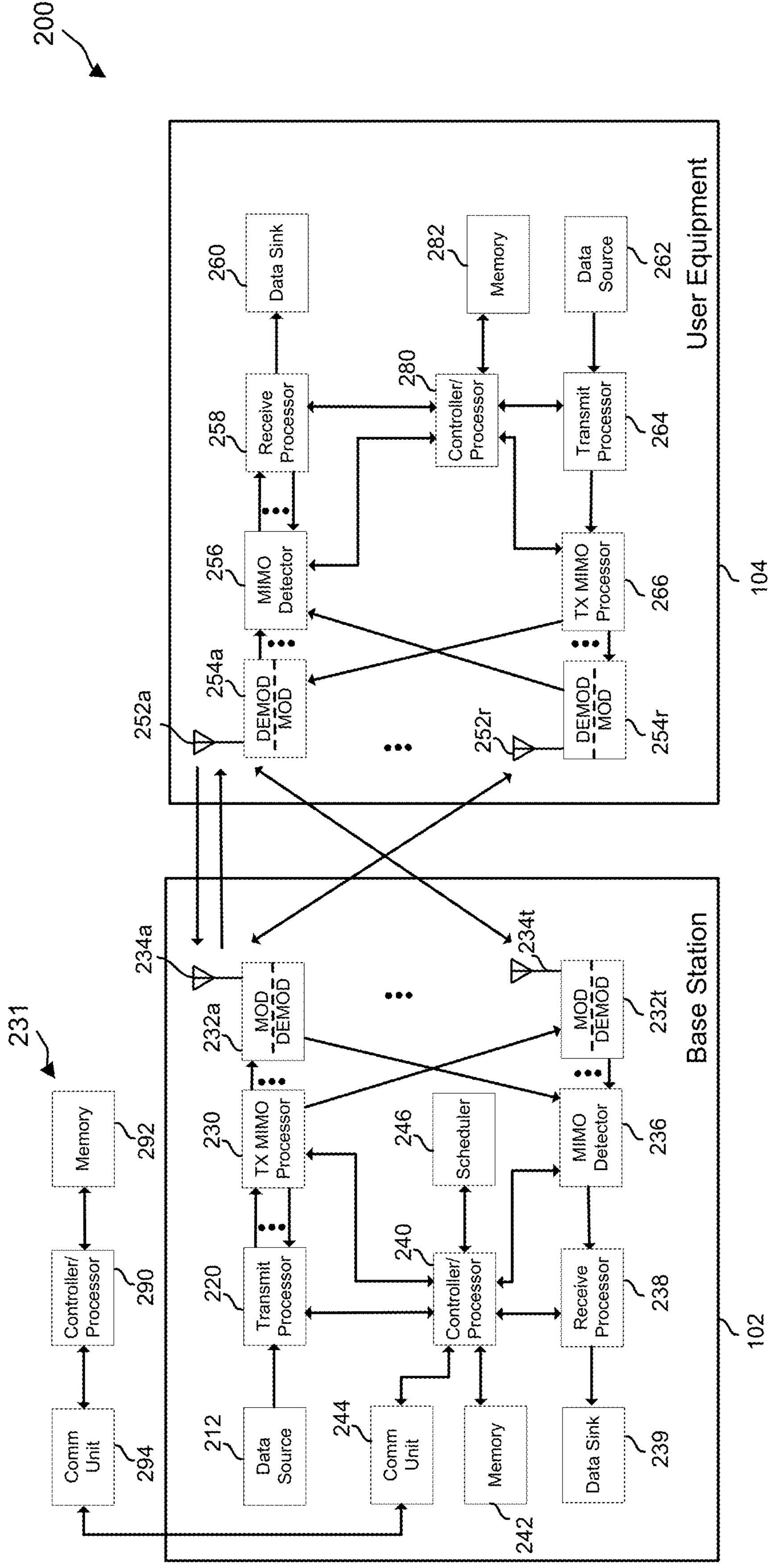
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
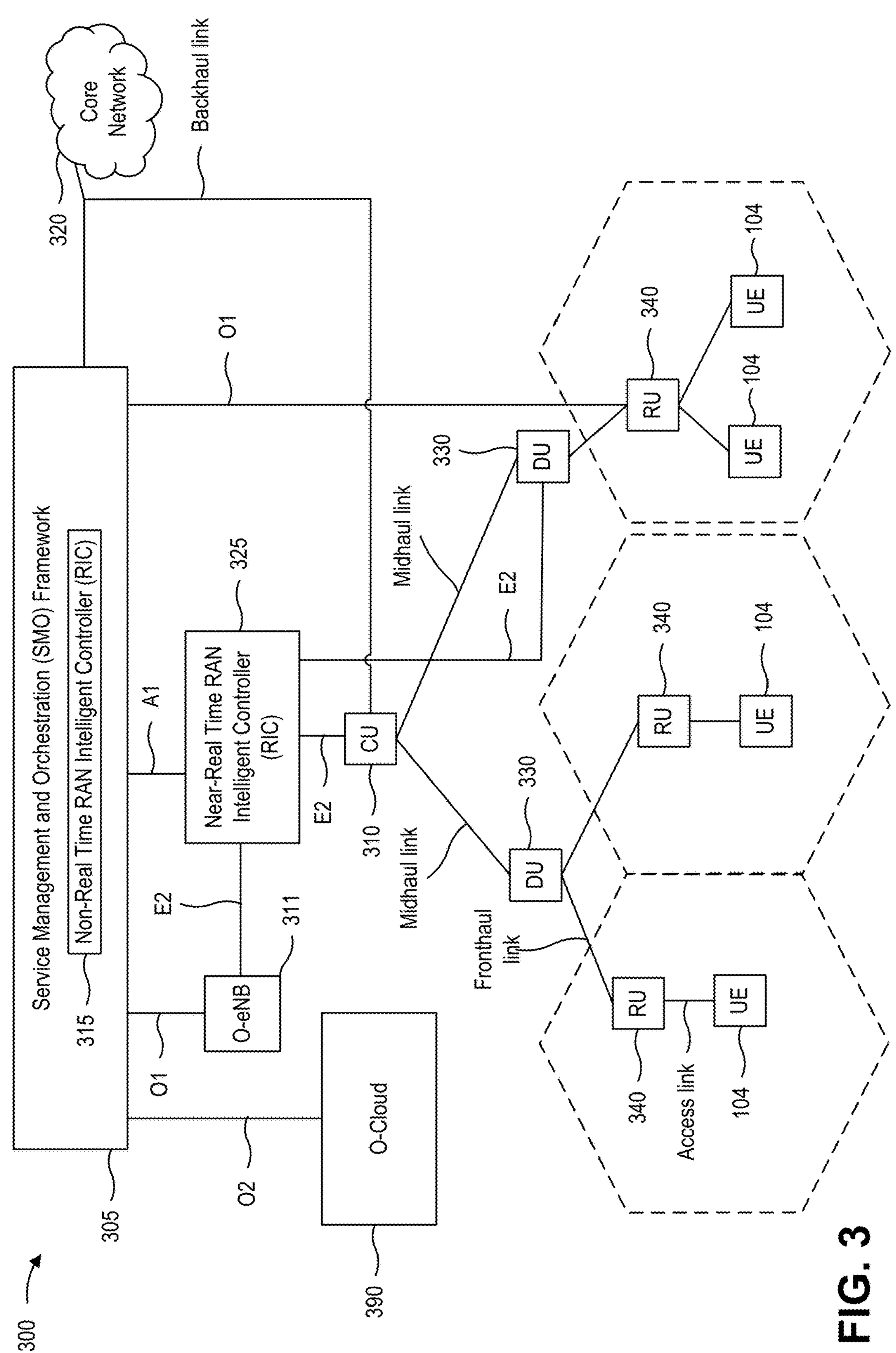
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an 02 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
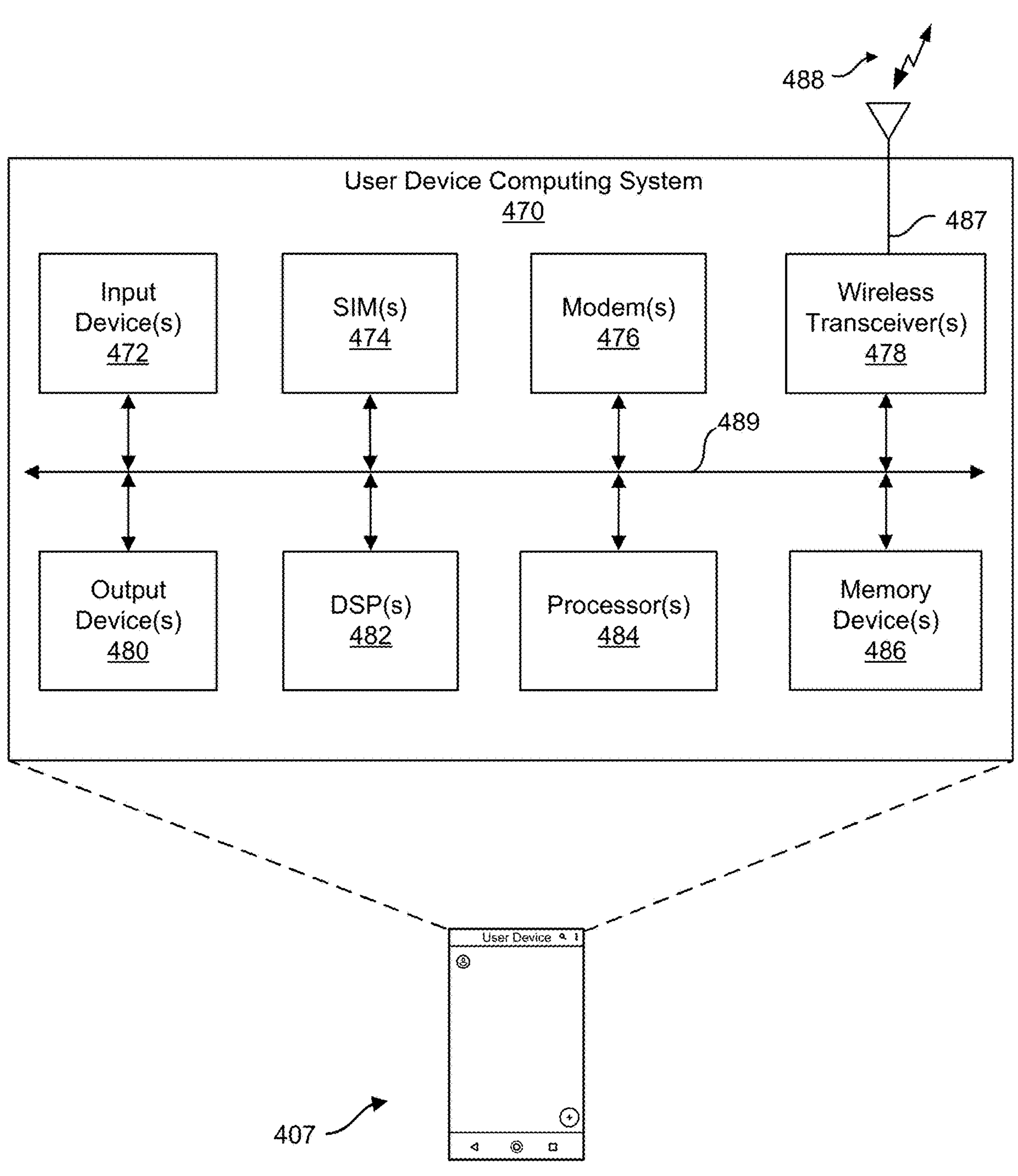
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 190, etc.), and energizing device, or other type of device (e.g., a station (STA) configured to communication using a Wi-Fi interface, WLAN STA 152, etc.) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICS, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the computing system 470 may be an energizing device (e.g., a reader device, such as a base station, an access point, a handheld reader device, etc.). In some cases, the energizing device may be a computing system 470 configured to transmit a downlink (DL) waveform capable of energizing an energy harvesting device (e.g., an ambient IoT device, such as a passive or semi-passive IoT device). As an example, the energizing device for an EH-BLE device may be a BLE device capable of transmitting a BLE signal. In some cases, the BLE signal may have a certain waveform and/or transmit power for certain frequencies, such as 30 dBm in 900 MHz ISM band, 20 dBm in 2.4 GHz in the US, and 10 dBm in 2.4 GHz in the EU.

A RF energy harvesting device can harvest RF energy from one or more RF signals received using an antenna. As used herein, the term "energy harvesting" may be used interchangeably with "power harvesting." In some aspects, an "energy harvesting device" can be a device that is capable of performing energy harvesting (EH). For example, as used herein, the term "energy harvesting device" may be used interchangeably with the term "EH-capable device" or "energy harvesting-capable device." In some aspects, energy harvesting device can be implemented as an Internet-of-Things (IoT) device, can be implemented as a sensor, etc.

In some cases, an energy harvesting device can be implemented as active or semi-passive energy harvesting device (e.g., also referred to as an active EH-capable device or a semi-passive EH-capable device, respectively). An active/semi-passive energy harvesting device may include one or more energy storage elements (e.g., collectively referred to as an "energy reservoir"). For example, the one or more energy storage elements can include batteries, capacitors, etc. In some examples, the one or more energy storage elements may be associated with a boost converter. The boost converter can receive as input at least a portion of the energy harvested by an energy harvester (e.g., with a remaining portion of the harvested energy being provided as instantaneous power for operating the energy harvesting device) and step up the harvested energy generated by the energy harvester to a voltage level associated with charging the one or more energy storage elements.

In some cases, passive and semi-passive energy harvesting devices transmit uplink communications by performing backscatter modulation to modulate and reflect a received downlink signal. The received downlink signal is used to provide both electrical power (e.g., to perform demodulation, local processing, and modulation) and a carrier wave for uplink communication (e.g., the reflection of the downlink signal). For example, a portion of the downlink signal will be backscattered as an uplink signal and a remaining portion of the downlinks signal can be used to perform energy harvesting.

Active energy harvesting devices can transmit uplink communications without performing backscatter modulation and without receiving a corresponding downlink signal (e.g., an active energy harvesting device includes an energy storage element to provide electrical power and includes a powered transceiver to generate a carrier wave for an uplink communication). In the absence of a downlink signal, passive and semi-passive energy harvesting devices cannot transmit an uplink signal (e.g., passive communication). Active energy harvesting devices do not depend on receiving a downlink signal in order to transmit an uplink signal and can transmit an uplink signal as desired (e.g., active communication).

Figure 5B:
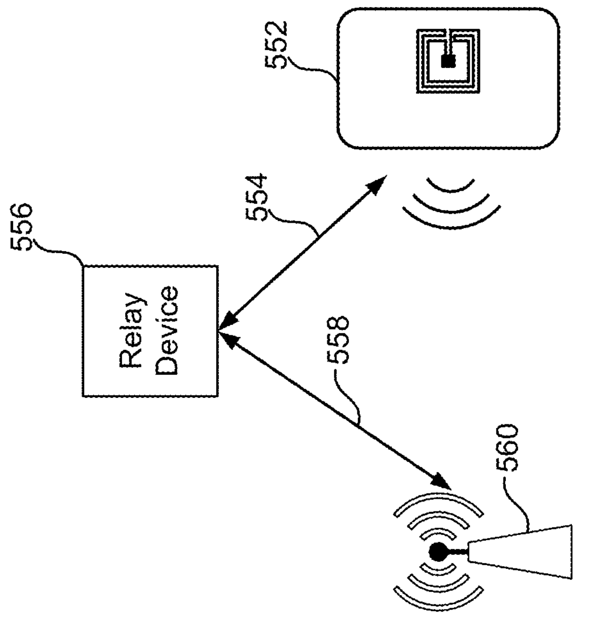
FIGS. 5A and 5B illustrate example network topologies of energy harvesting devices in a wireless system, in accordance with aspects of the present disclosure.
Figure 5A:
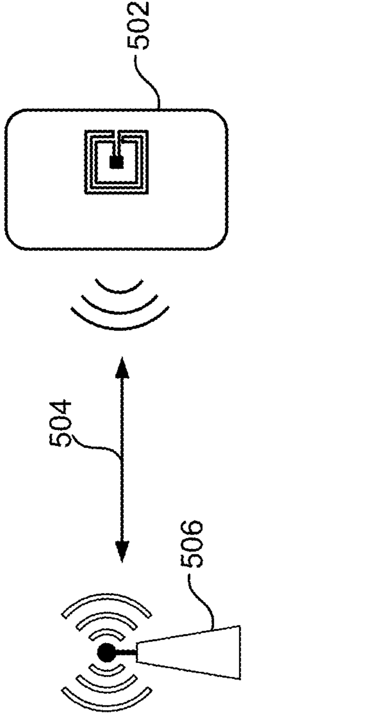

FIGS. 5A and 5B illustrate example network topologies of energy harvesting devices in a wireless system, in accordance with aspects of the present disclosure. In FIG. 5A, an energy harvesting device 502 may harvest energy from transmissions from a network node 506 (e.g., reader device, wireless node, AP, gNB, base station, etc.) and use the harvested energy to communicate 504 with the network node 506. For example, the energy harvesting device 502 may receive UL/DL scheduling in which the ZP IoT device 502 may listen (e.g., monitor) for communications from the network node 506 or transmit data to the network node 506.

FIG. 5B includes an energy harvesting device 552, which may or may not be the same energy harvesting device 502 as shown in FIG. 5A. The energy harvesting device 552 in FIG. 5B may communicate 554 with a relay device 556 (e.g., reader device, wireless device, etc.), and the relay device 556 may relay 558 communications from the energy harvesting device 552 to a network node 560, and vice versa. In some cases, the energy harvesting device 552 may communicate 554 with the relay device 556 using a different radio access technology as compared to a radio access technology used by energy harvesting device 502 to communicate with the network node 506. For example, energy harvesting device 552 may use Bluetooth low energy or another low energy communications protocol to communicate with the relay device 556 rather than a cellular protocol, such as 5G NR, LTE, and the like. In some cases, a reader device may be a device that can transmit a signal that may be used to provide power to an energy harvesting device and can receive signals from the energy harvesting device.

In some cases, the energy harvesting device may be an active energy harvesting device which may listen (e.g., monitor) for wake-up signals and transmit during assigned uplink (UL) periods. In some cases, the energy harvesting device may synchronize in time with the energizing device based on transmissions from the energizing device, such as a BLE beacon transmission. For example, the energy harvesting device may listen for dips in a waveform of the transmission from the energizing device within a measurement period to time synchronize with the energizing device. This time synchronization may allow the energy harvesting device to listen for potential wake-up signals, listen for UL signals, transmit DL signals, etc. at a correct time.

Figure 6:
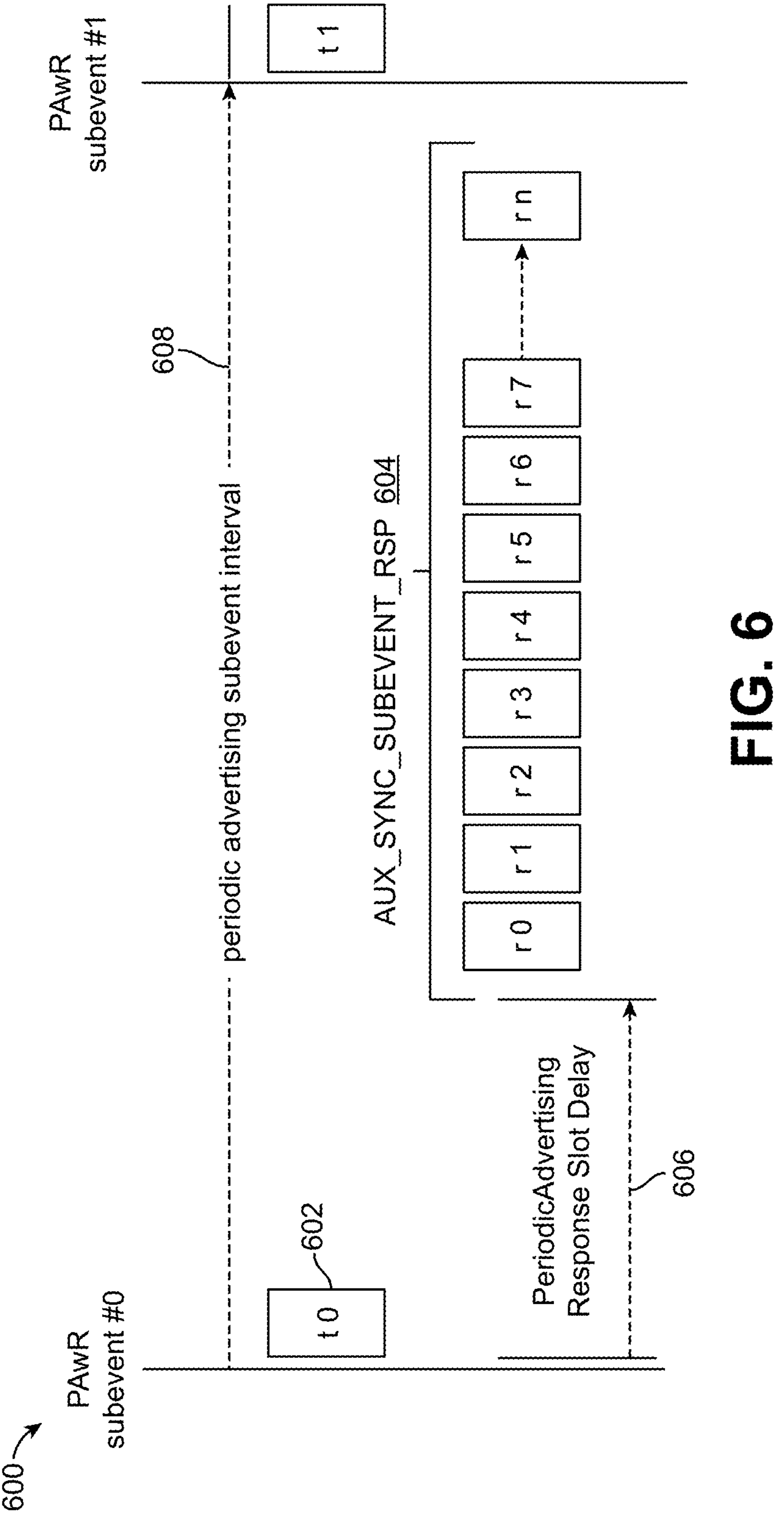
FIG. 6 is a timeline illustrating signal timings for an ESL system, in accordance with aspects of the present disclosure.

FIG. 6 is a timeline illustrating signal timings 600 for an ESL system. As shown in FIG. 6, an ESL AP (e.g., wireless device, wireless node, AP, etc.) may transmit, in a slot of a periodic advertising interval, an advertisement packet 602 to one or more label devices. In some cases, the advertisement packet 602 may indicate which ESL label devices are being addressed. Examples of the advertisement packet 602 may include a sync request (e.g., AUX_SYNC_SUBEVENT_IND, a connect request (e.g., AUX_CONNECT_REQ), etc. In some cases, the advertisement packet 602 may be transmitted periodically (e.g., every 1.6 seconds within a periodic advertising subevent interval 608). The ESL label devices may respond 604 to the advertisement packet 602 after a periodic advertising response slot delay 606. The periodic advertising response slot delay 606 may provide time for the relatively low powered ESL label devices to receive and process the advertisement packet 602.

To help avoid interfering with an ESL system, an energizer of an energy harvesting system may periodically listen (e.g., monitor) for ESL AP packets (e.g., advertisement packet 602). If the energizer detects ESL AP packets which have at least a threshold signal strength, the energizer may align the transmissions of the energizer and/or energy harvesting devices, based on the ESL system. In some cases, the signal strength may be measured based on a reference signal received power (RSRP), received signal strength indicator (RSSI), reference signal received quality (RSRQ), channel quality indicator (CQI), and/or the like. In some cases, the energizer may align any of an advertisement beacon of the energizer, DL transmission from the energizer, and/or UL transmission from the energy harvesting devices based on the ESL system.

Figure 7:
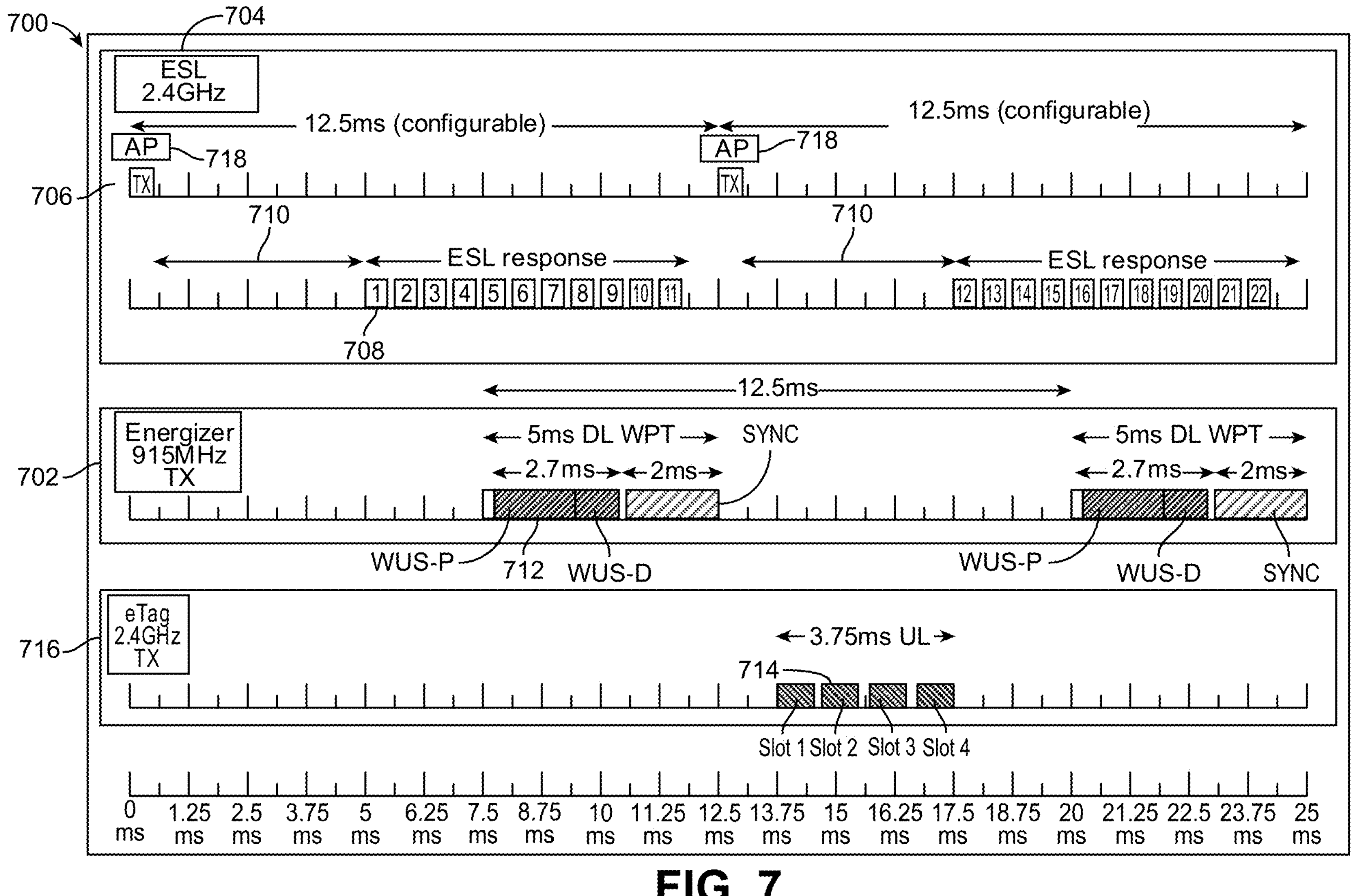
FIG. 7 illustrates signal timing for a dual band energy harvesting system operating along with an ESL system, in accordance with aspects of the present disclosure.

FIG. 7 illustrates signal timing 700 for a dual band energy harvesting system operating along with an ESL system, in accordance with aspects of the present disclosure. As indicated above, an energy harvesting system may, at least in part, operate on frequencies which overlap those used by an ESL system 704. In some cases, an energizer 702 may determine a delay period for the ESL system 704 where the ESL system is not expected to transmit. For example, the energizer 702 may listen (e.g., monitor) for ESL packets (e.g., from an ESL AP 718 and/or ESL devices), which may be transmitted periodically. For example, the energizer 702 may listen for an advertisement packet transmission 706 from the ESL AP 718. The energizer 702 may also listen for UL transmissions 708 from one or more ESL devices to determine a length of time for a periodic advertising response slot delay 710. In some cases, the energizer 702 may parse the advertisement packet transmission 706 from the ESL AP 718 to determine the length of time for the periodic advertising response slot delay 710.

The energizer 702 may have information indicating a wake-up time period between a wake-up signal UL transmission and sync transmission 712 from the energizer 702 to when UL response 714 from an energy harvesting device 716 may be received. The energizer 702 may then schedule the wake-up signal UL transmission and sync transmission 712 from the energizer 702 such that the UL response 714 from an energy harvesting device 716 may be transmitted during the periodic advertising response slot delay 710. For example, the energy harvesting device 716 may transmit it's UL response 714 a certain number of slots after receiving the sync message of the wake-up signal UL transmission and sync transmission 712 from the energizer 702. The energizer 702 may know that the energy harvesting device 716 may transmit the UL response 714 a certain number of slots after receiving the sync message (e.g., the UL response 714 is hardcoded, has an expected delay, or otherwise configured to occur after the certain number of slots), so the energizer 702 may schedule the wake-up signal UL transmission and sync transmission 712 such that the certain number of slots after the sync message is transmitted will occur during the periodic advertising response slot delay 710. In some cases, the energizer 702 may indicate one or more response slots to the energy harvesting device 716 for the UL response 714. For example, the energizer 702 may indicate the one or more response slots in a payload portion of the wake-up signal UL transmission and sync transmission 712.

As the energy harvesting devices 716 and ESL devices may be relatively low power devices, it may be useful to avoid scheduling other transmissions when the energy harvesting devices 716 and/or ESL devices are expected to transmit. In some cases, the wake-up signal UL transmission 712 may include a signal for energizing the energy harvesting device.

In some cases, the energy harvesting system may operate in using multiple bands (e.g., frequencies, such as 900 MHz and 2.4 GHz). In such cases, one band that the energy harvesting system operates on may overlap with the ESL system while another band may not overlap. In such cases, traffic on the band that overlaps with the ESL system may be scheduled during the periodic advertising response slot delay 710. For example, the wake-up signal UL transmission 712 may be transmitted on a different, non-overlapping band, as compared to the UL response 714 and/or UL transmissions 708. In such cases, the wake-up signal UL transmission 712 may be transmitted concurrent (e.g., overlapping, at a same time) with the UL transmissions 708 from one or more ESL devices, while the UL response 714 may be scheduled during the periodic advertising response slot delay 710.

Figure 8:
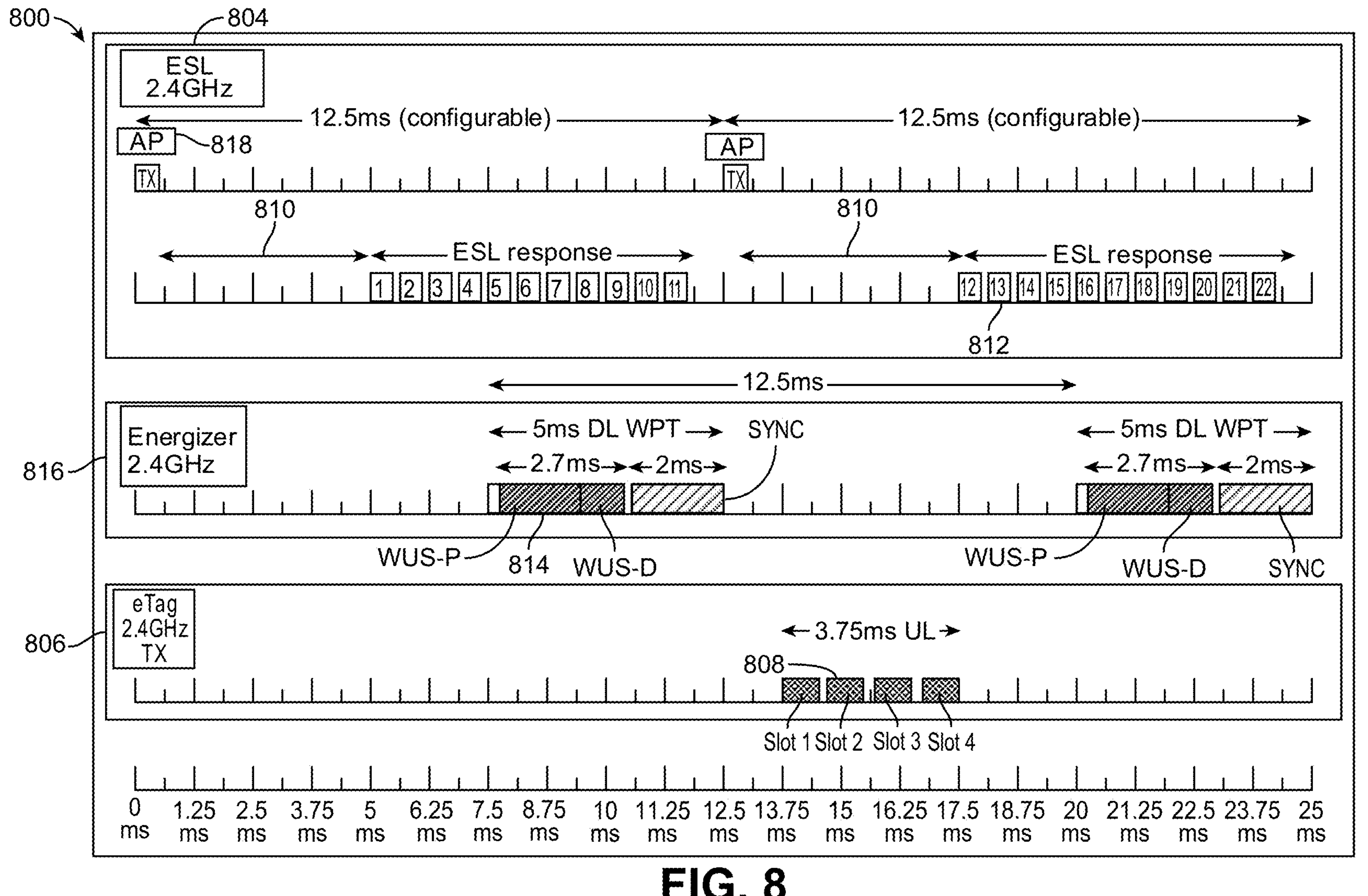
FIG. 8 illustrates signal timing for a single band energy harvesting system operating along with an ESL system, in accordance with aspects of the present disclosure.

FIG. 8 illustrates signal timing 800 for a single band energy harvesting system operating along with an ESL system, in accordance with aspects of the present disclosure. In some cases, an energy harvesting system may operate in a same band (e.g., frequency) as those used by an ESL system 804. The single band energy harvesting system may operate in a manner similar to that described above in FIG. 7 with respect to the dual band energy harvesting system. In some cases, as energy harvesting devices 806 may be relatively low power devices, UL transmissions 808 of the energy harvesting devices 806 may be scheduled to transmit when the ESL system (e.g., ESL AP 818 and ESL devices) are not transmitting, such as during the periodic advertising response slot delay 810. In some cases, wake-up signal UL transmission 814 of the energizer 816 of the energy harvesting system may overlap with UL transmissions 812 of the ESL devices. In some cases, the energizer 816 of single band energy harvesting systems may be relatively short ranged and/or highly mobile (e.g., hand-held energizers) and interference with the ESL system 804 may be intermittent. Retransmission may be used by the ESL system 804 to overcome potential interference by the single band energy harvesting system.

Figure 9:
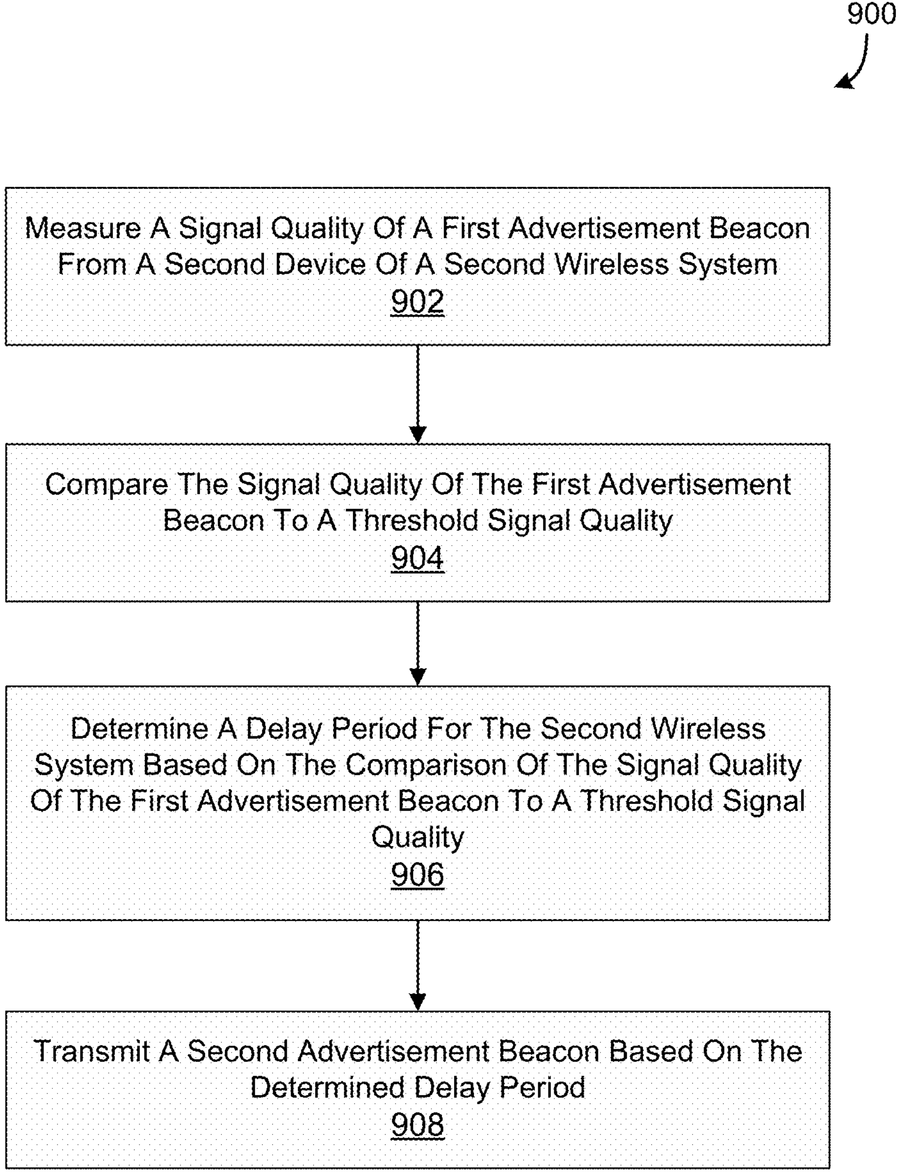
FIG. 9 is a flow diagram illustrating an example of a process for wireless communications, in accordance with some examples.

FIG. 9 is a flowchart diagram illustrating an example of a process 900 for wireless communications. The process 900 may be performed by a first device or by a component or system (e.g., a chipset) of the first device. The first device may be a reader and/or energizing device, such as a base stations 102, AP 150 of FIG. 1 and FIG. 2, computing system 470 of FIG. 4, network node 506 of FIG. 5A, network node 560 of FIG. 5B, relay device 556 of FIG. 5B, energizer 804 of FIG. 8, computing system 1000 of FIG. 10, etc., a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 900 may be performed by a UE, a reader device, and/or an energizing device. In some cases, the UE can be an energizing device. The operations of the process 900 may be implemented as software components that are executed and run on one or more processors (e.g., processor 1010 of FIG. 10 or other processor(s)). Further, the transmission and reception of signals by the network device in the process 900 may be enabled, for example, by one or more antennas, one or more transceivers (e.g., wireless transceiver(s)), and/or other communication components (e.g., the transmit processor 266, 264, the receive processor 238, 258, the TX MIMO processor 230, 266, the MIMO detector 236, 256, the modulator(s)/demodulator(s) 232*a* through 232*t*, 255*a* through 254*t*, and/or the antenna(es) 234*a* through 234*t*, 252*a* through 252*t* of FIG. 2, the communication interface 1040 of FIG. 10, or other antennae(s), transceiver(s), and/or component(s)).

At block 902, the first device (or component thereof) may measure a signal strength of a first advertisement beacon (e.g., advertisement packet 602 of FIG. 6, advertisement packet transmission 706 of FIG. 7, etc.) from a second device (e.g., ESL AP 718 of FIG. 7, ESL AP 818 of FIG. 8, etc.) of a second wireless system (e.g., ESL system 704 of FIG. 7, ESL system 804 of FIG. 8, etc.). In some cases, the signal strength comprises at least one of a reference signal received power (RSRP), received signal strength indicator (RSSI), reference signal received quality (RSRQ), or channel quality indicator (CQI).

At block 904, the first device (or component thereof) may compare the signal strength of the first advertisement beacon to a threshold signal strength.

At block 906, the first device (or component thereof) may determine a delay period (e.g., periodic advertising response slot delay 606 of FIG. 6, periodic advertising response slot delay 710 of FIG. 7, periodic advertising response slot delay 810 of FIG. 8, etc.) for the second wireless system based on the comparison of the signal strength of the first advertisement beacon to a threshold signal strength. In some cases, the delay period comprises a time period between the first advertisement beacon from the second device and an uplink transmission (e.g., response 604 of FIG. 6, UL transmissions 708 of FIG. 7, UL transmissions 812 of FIG. 8, etc.) by a third device of the second wireless system. In some examples, the first device (or component thereof) may determine the delay period for the second wireless system by monitoring for the uplink transmission by the third device. In some cases, the second wireless system comprises an electronic shelf label system.

At block 908, the first device (or component thereof) may output a second advertisement beacon for transmission based on the determined delay period. In some cases, the second advertisement beacon causes a fourth device of the first wireless system to transmit an uplink response message to the first device. In some examples, the uplink response message is transmitted during the delay period. In some cases, the delay period for the second wireless system is determined based on an expected delay between the second advertisement beacon and transmission of the uplink response message. In some examples, the second advertisement beacon is configured to energize the fourth device. In some cases, the second advertisement beacon is transmitted on a different band as compared to the uplink response message.

In some examples, the processes described herein (e.g., process 900, and/or other process described herein) may be performed by a computing device or apparatus (e.g., a reader device such as a UE, base station, a portion of a base station, etc.). For example, as noted above, one or more of the processes described herein (e.g., the process 90, and/or other process described herein) may be performed by a UE and/or an energizing device (e.g., a reader device). In some examples, one or more of the processes described herein (e.g., the process 900, and/or other process described herein) may be performed by an energizing device with an architecture that is the same as or similar to the computing system 1000 of FIG. 10.

In some examples, the techniques or processes described herein may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 900 and/or other processes described herein may include a processor, microprocessor, micro-computer, or other component of a device that is configured to carry out the steps of the process 900 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 900 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 900 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
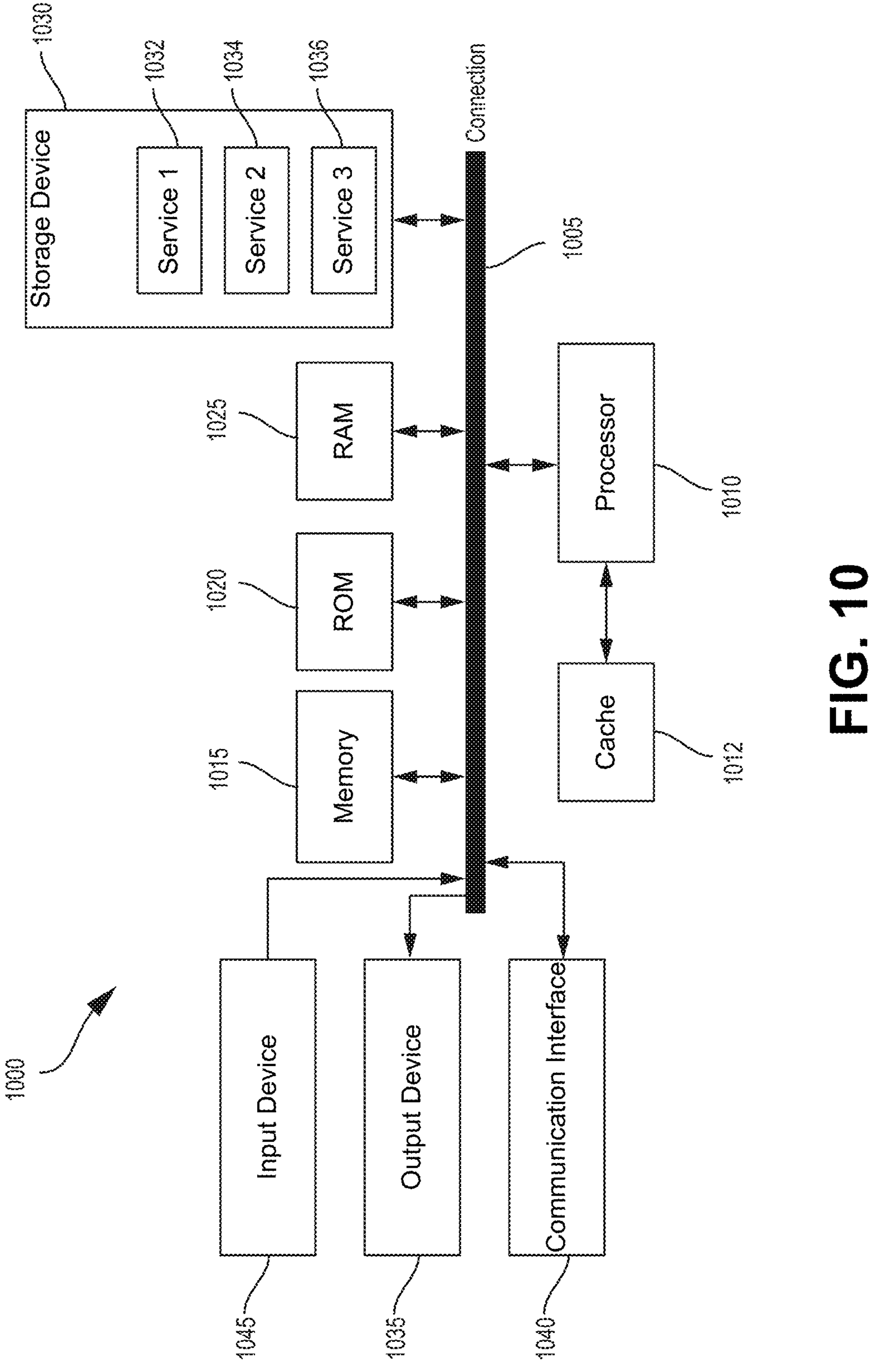
FIG. 10 is a block diagram illustrating an example of a computing system, in accordance with some examples.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some aspects, computing system 1000 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1000 includes at least one processing unit (CPU or processor) 1010 and connection 1005 that communicatively couples various system components including system memory 1025, such as read-only memory (ROM) 1020 and random access memory (RAM) 1025 to processor 1010. Computing system 1000 may include a cache 1015 of high-speed memory connected directly with, in close proximity to, or integrated as part of processor 1010.

Processor 1010 may include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some aspects, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A first device of a first wireless system for wireless communications, comprising: at least one memory; and at least one processor coupled to the at least one memory, the at least one processor configured to: measure a signal strength of a first advertisement beacon from a second device of a second wireless system; compare the signal strength of the first advertisement beacon to a threshold signal strength; determine a delay period for the second wireless system based on the comparison of the signal strength of the first advertisement beacon to a threshold signal strength; and output a second advertisement beacon for transmission based on the determined delay period.

Aspect 2. The first device of Aspect 1, wherein the signal strength comprises at least one of a reference signal received power (RSRP), received signal strength indicator (RSSI), reference signal received quality (RSRQ), or channel quality indicator (CQI).

Aspect 3. The first device of any of Aspects 1-2, wherein the delay period comprises a time period between the first advertisement beacon from the second device and an uplink transmission by a third device of the second wireless system.

Aspect 4. The first device of Aspect 3, wherein, to determine the delay period for the second wireless system, the at least one processor is configured to monitor for the uplink transmission by the third device.

Aspect 5. The first device of any of Aspects 1-4, wherein the second wireless system comprises an electronic shelf label system.

Aspect 6. The first device of any of Aspects 1-5, wherein the second advertisement beacon causes a fourth device of the first wireless system to transmit an uplink response message to the first device.

Aspect 7. The first device of Aspect 6, wherein the uplink response message is transmitted during the delay period.

Aspect 8. The first device of any of Aspects 6-7, wherein the delay period for the second wireless system is determined based on an expected delay between the second advertisement beacon and transmission of the uplink response message.

Aspect 9. The first device of any of Aspects 6-8, wherein the second advertisement beacon is configured to energize the fourth device.

Aspect 10. The first device of any of Aspects 6-9, wherein the second advertisement beacon is transmitted on a different band as compared to the uplink response message.

Aspect 11. A method for wireless communications by a first device of a first wireless system, comprising: measuring a signal strength of a first advertisement beacon from a second device of a second wireless system; comparing the signal strength of the first advertisement beacon to a threshold signal strength; determining a delay period for the second wireless system based on the comparison of the signal strength of the first advertisement beacon to a threshold signal strength; and outputting a second advertisement beacon for transmission based on the determined delay period.

Aspect 12. The method of Aspect 11, wherein the signal strength comprises at least one of a reference signal received power (RSRP), received signal strength indicator (RSSI), reference signal received quality (RSRQ), or channel quality indicator (CQI).

Aspect 13. The method of any of Aspects 11-12, wherein the delay period comprises a time period between the first advertisement beacon from the second device and an uplink transmission by a third device of the second wireless system.

Aspect 14. The method of Aspect 13, wherein determining the delay period for the second wireless system comprises monitoring for the uplink transmission by the third device.

Aspect 15. The method of any of Aspects 11-14, wherein the second wireless system comprises an electronic shelf label system.

Aspect 16. The method of any of Aspects 11-15, wherein the second advertisement beacon causes a fourth device of a first wireless system to transmit an uplink response message to the first device.

Aspect 17. The method of Aspect 16, wherein the uplink response message is transmitted during the delay period.

Aspect 18. The method of any of Aspects 16-17, wherein the delay period for the second wireless system is determined based on an expected delay between the second advertisement beacon and transmission of the uplink response message.

Aspect 19. The method of any of Aspects 16-18, wherein the second advertisement beacon is configured to energize the fourth device.

Aspect 20. The method of any of Aspects 16-19, wherein the second advertisement beacon is transmitted on a different band as compared to the uplink response message.

Aspect 21. A non-transitory computer-readable medium having stored thereon instructions that, when executed by at least one processor, cause the at least one processor to perform operations according to any of Aspects 11-20.

Aspect 22. An apparatus for wireless communications, comprising one or more means for performing operations according to any of Aspects 11 to 20.

What is claimed is:

1. A first device of a first wireless system for wireless communications, comprising:

at least one memory; and at least one processor coupled to the at least one memory, the at least one processor configured to:

measure a signal strength of a first advertisement beacon from a second device of a second wireless system;

compare the signal strength of the first advertisement beacon to a threshold signal strength to determine that the signal strength exceeds the threshold signal strength;

determine, based on the determination that the signal strength exceeds the threshold signal strength, a delay period for the second wireless system based on an expected amount of time for an energy harvesting device associated with the first wireless system to transmit a response; and output a second advertisement beacon for transmission based on the determined delay period.

2. The first device of claim 1, wherein the signal strength comprises at least one of a reference signal received power (RSRP), received signal strength indicator (RSSI), reference signal received quality (RSRQ), or channel quality indicator (CQI).

3. The first device of claim 1, wherein the delay period comprises a time period between the first advertisement beacon from the second device and an uplink transmission by a third device of the second wireless system.

4. The first device of claim 3, wherein, to determine the delay period for the second wireless system, the at least one processor is configured to monitor for the uplink transmission by the third device.

5. The first device of claim 1, wherein the second wireless system comprises an electronic shelf label system.

6. The first device of claim 1, wherein the second advertisement beacon causes a fourth device of the first wireless system to transmit an uplink response message to the first device.

7. The first device of claim 6, wherein the uplink response message is transmitted during the delay period.

8. The first device of claim 6, wherein the delay period for the second wireless system is determined based on an expected delay between the second advertisement beacon and transmission of the uplink response message.

9. The first device of claim 6, wherein the second advertisement beacon is configured to energize the fourth device.

10. The first device of claim 6, wherein the second advertisement beacon is transmitted on a different band as compared to the uplink response message.

11. A method for wireless communications by a first device of a first wireless system, comprising:

measuring a signal strength of a first advertisement beacon from a second device of a second wireless system;

comparing the signal strength of the first advertisement beacon to a threshold signal strength to determine that the signal strength exceeds the threshold signal strength;

determining, based on the determination that the signal strength exceeds the threshold signal strength, a delay period for the second wireless system based on an expected amount of time for an energy harvesting device associated with the first wireless system to transmit a response; and outputting a second advertisement beacon for transmission based on the determined delay period.

12. The method of claim 11, wherein the signal strength comprises at least one of a reference signal received power (RSRP), received signal strength indicator (RSSI), reference signal received quality (RSRQ), or channel quality indicator (CQI).

13. The method of claim 11, wherein the delay period comprises a time period between the first advertisement beacon from the second device and an uplink transmission by a third device of the second wireless system.

14. The method of claim 13, wherein determining the delay period for the second wireless system comprises monitoring for the uplink transmission by the third device.

15. The method of claim 11, wherein the second wireless system comprises an electronic shelf label system.

16. The method of claim 11, wherein the second advertisement beacon causes a fourth device of a first wireless system to transmit an uplink response message to the first device.

17. The method of claim 16, wherein the uplink response message is transmitted during the delay period.

18. The method of claim 16, wherein the delay period for the second wireless system is determined based on an expected delay between the second advertisement beacon and transmission of the uplink response message.

19. The method of claim 16, wherein the second advertisement beacon is configured to energize the fourth device.

20. The method of claim 16, wherein the second advertisement beacon is transmitted on a different band as compared to the uplink response message.

* * * * *